United States Patent Office 2,864,072
Patented Dec. 9, 1958

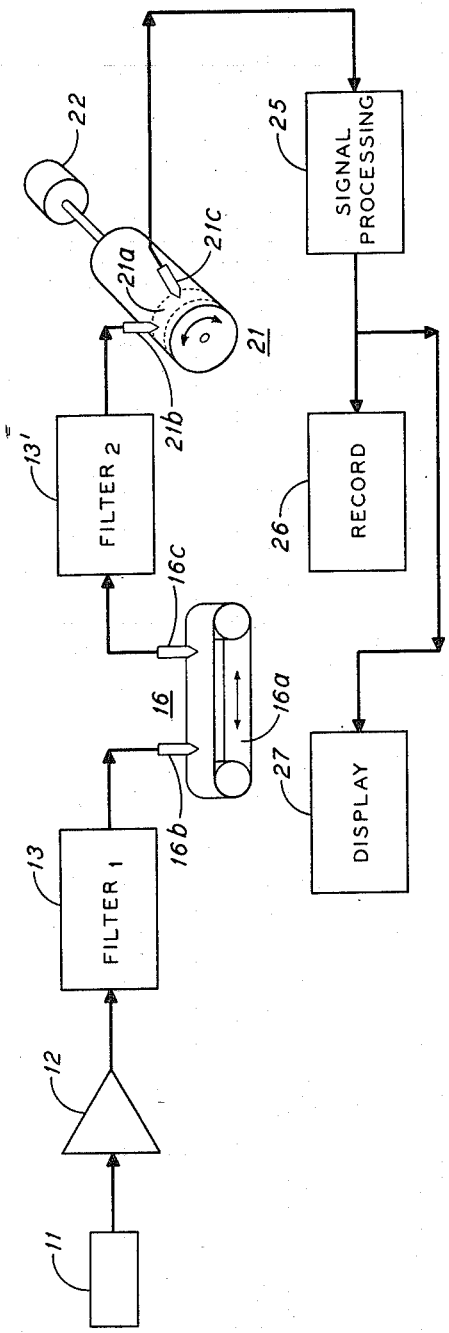
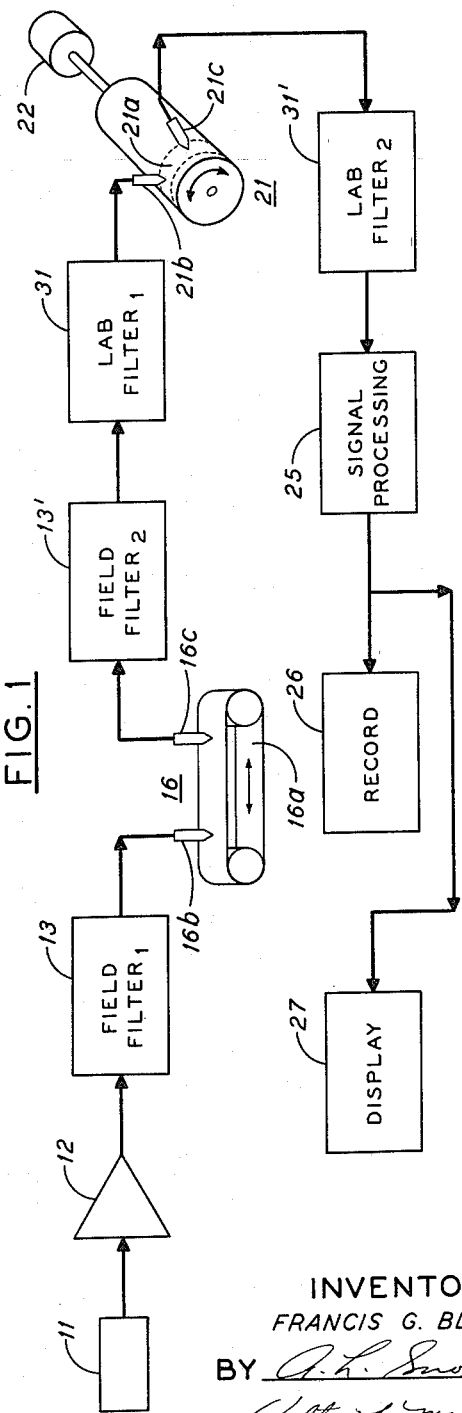

2,864,072

METHOD AND APPARATUS FOR ELIMINATING PHASE DISTORTION IN SEISMIC SIGNALS

Francis G. Blake, Fullerton, Calif., assignor to California Research Corporation, San Francisco, Calif., a corporation of Delaware Application June 16, 1954, Serial No. 437,264

1 Claim. (Cl. 340—15)

This invention relates in general to methods and apparatus for use in seismic prospecting, and relates more specifically to methods and apparatus for reducing or eliminating phase distortion in seismic detector signals.

In the art of seismic prospecting, seismic waves artificially generated in the earth are utilized to actuate a plurality of seismic detectors which are responsive to reflections and refractions of such waves from subsurface strata and which produce an electrical output signal varying in sympathy with the received seismic waves. The usual seismic detector signal contains a fairly wide range of different frequency components, and the signal is usually filtered to some extent and then recorded. In the case of reproducible recording of seismic detector signals, the signal is filtered prior to being recorded and then additional filtering operations, usually in the laboratory, may be performed on the reproduced signal.

The seismic waves produced by the explosion or other source of seismic energy are composed of a number of different frequency components, and owing to the transmission characteristics of the earth, these different frequency components are differently altered in phase in passing through the earth. Additionally, after the seismic waves have been converted into an electrical signal by the seismic detector, the different frequency components of the seismic detector signal are differently altered in phase by the elements of the seismic recording system, such as filters, geophones and amplifiers. Such phase distortion, either in the seismic waves or in the seismic detector signal, is undesirable, particularly if different detector signals are to be mixed or added together to produce a composite signal, and such distortion usually necessitates some type of correction.

Broadly, the present invention contemplates methods and apparatus for analyzing a seismic detector signal in a manner to substantially remove the phase distortion introduced either into the seismic waves in traveling through the earth or into the seismic detector signal by the various components of the recording and/or analyzing system.

In accordance with the present invention, the seismic detector signal having some type of phase distortion therein is reproducibly recorded, and the recorded signal is then reproduced in the reverse order from which the signal occurred; that is, the last part of the original recorded signal is reproduced first. The reproduced, reversed signal is then passed through a device or system having substantially the same complex transfer function as the system which introduced the phase distortion into the signal.

When the phase distortion is the result of distortion of the different frequency components of the seismic wave by the earth, the device through which the reproduced, reversed seismic detector signal is passed may be an electrical network having an electrical complex transfer function which is analogous to the acoustical complex transfer function of the portion of the earth through which the seismic waves passed. When the phase distortion is produced by the elements of the seismic amplifying and recording system, the network through which the reversed signal is passed may be a substantial duplicate of the first network, or it may, through suitable reversing connections, be the first network itself.

In this reversed passage of the signal through the device or system, the seismic detector signal is distorted in phase, but this phase distortion has the opposite sign of the original phase distortion, so that the net phase distortion is zero for the two passages of the signal through the device or system. This operation may be performed for any number of networks or devices which introduce phase distortion into a seismic signal.

The method and apparatus of this invention have particular application in correcting for the phase distortion introduced into the seismic detector signal by electrical filtering networks. By passing the reversed seismic detector signal through a filter having substantially the same electrical characteristics as the filter which produced the original distortion, the total effective phase shift is reduced to substantially zero and the total transmission is the square of the transmission for one passage through the filter. Thus, by repeatedly passing a signal an even number of times through a filter, and reversing the sequence of the signal each time, the slope of the sides of the over-all filter frequency response curve may be as steep as desired without introducing any substantial phase distortion in the final output signal.

It is therefore an object of the present invention to provide improved methods and apparatus for recording and analyzing seismic detector signals.

It is an additional object of the present invention to provide a method for analyzing a seismic detector signal which has been phase-distorted by passage through an electrical network, in which method the signal is reversed in time and passed through an electrical network having substantially the same electrical characteristics as the first-mentioned network to substantially remove the phase distortion.

It is a further object of this invention to provide a method for analyzing an electrical seismic detector signal which has phase distortion therein among the different frequency components as a result of a system having a complex transfer function, in which method the electrical signal is reversed in time and passed through an electrical network having a complex transfer function analogous to the complex transfer function of the system which introduced the phase distortion, to substantially remove the phase distortion.

It is a further object of this invention to provide methods and apparatus for analyzing a seismic detector signal which has been phase-distorted by passage through an electrical network, in which method and apparatus the signal is reproducibly recorded, reproduced in the reverse time sequence from which the signal occurred, and passed through an electrical network having substantially the same electrical characteristics as the first-mentioned network to substantially eliminate the phase distortion from the signal.

It is an additional object of the present invention to provide methods and apparatus for filtering a seismic detector signal in which the signal is passed through an electrical filter network an even number of times, with the signal reversed in time sequence on alternate passages through the filter network, to filter the signal without introducing any substantial resultant phase distortion therein.

Objects and advantages other than those outlined above will readily be apparent from the following description when read in connection with the accompanying drawing, in which:

Fig. 1 diagrammatically illustrates one embodiment of the invention utilized in connection with the analysis of seismic signals, and Fig. 2 diagrammatically illustrates an alternate embodiment of the invention utilized in connection with a plurality of electrical networks which introduce phase distortion into a seismic signal.

Referring to Fig. 1, numeral 11 designates a seismic detector responsive to seismic waves for producing an electrical signal varying in sympathy with the received seismic waves. The output from detector 11 is supplied to suitable amplifying means 12, where the signal is amplified and supplied to a filtering network 13. Filter 13 may have any desired characteristics, but preferably this filter attenuates only a small portion or band of the frequencies present in the original seismic signal to preserve a maximum of the original components for recording.

The signal from filter 13 is recorded on a suitable reproducible recording medium such as a magnetic tape recorder 16 having a length of magnetizable tape 16a and provided with at least one recording head 16b and at least one pickup or reproducing head 16c. As is well known in the art, variations in the signals supplied to recording head 16b produce a variable magnetization of tape 16a as the tape passes under this recording head. The recorded information may be subsequently withdrawn from the tape a number of times through reproducing head 16c. Recorder 16 is of the type in which tape 16a may be moved past reproducing head 16c in either direction, either by reversing the drive connections of the recorder or by removing and reversing the length of tape 16a.

The output from reproducing head 16c is supplied to a device or network which may be a network simulating the complex transfer functions of both filter 13 and the portion of the earth through which the seismic waves passed in reaching the detector. That is, the network could have a portion representing an electrical analog of the complex acoustic transfer function of the portion of the earth through which the seismic waves passed and a portion substantially identical to filter 13. Alternatively, the output from reproducing head 16c may be supplied to a second filtering network 13', which has substantially the same electrical transfer function as filter 13. After passing through filter 13', the reproduced signal is supplied to recording head 21b of another reproducible recording medium, such as a magnetic drum 21 having a rotor covered with a layer of magnetizable material 21a and provided with at least one reproducing head 21c. Drum 21 may be driven by any suitable means, such as a motor 22 capable of providing rotation of drum 21 in either direction. As with recorder 16, variations in the signal supplied to recording head 21b variably magnetize the portion of layer 21a passing under this head as the drum rotates, and reproducing head 21c is used to subsequently withdraw the recorded signal.

The output from reproducing head 21c is supplied to means shown diagrammatically at 25 for performing one or more different operations on the seismic signal. Such operations may be classified as signal processing operations and may include additional filtering or the mixing of signals from different seismic detectors in the spread to produce a composite signal. The output from signal processing means 25 is preferably supplied to recording means 26 and/or display means 27 for producing both a permanent record of the signal and an oscilloscopic display for rapid visual evaluation of the effects of the different operations performed on the signal.

In the operation of the system shown in Fig. 1, the signal generated by seismic detector 11 is amplified by amplifier 12 and filtered in device 13 and recorded on reproducible recording means 16, as is well known in the art. Filtering device 13 introduces some phase distortion among the different frequency components of the seismic detector signal passing therethrough so that the signal recorded on recorder 16 contains the phase distortion introduced into the signal by filter 13 and, usually to a lesser extent, by amplifier 12 and geophone 11. To substantially remove this phase distortion from the signal, the direction of rotation of tape 16a is reversed with respect to its direction of rotation during recording of the signal. As mentioned above, such reversal may be obtained by either providing recorder 16 with a reversible drive mechanism or by removing and reversing the tape 16a on the tape drive mechanism. The recorded signal may then be reproduced in the reverse order from that in which it was recorded, with the end of the original signal passing first under reproducing head 16c. This reproduced, reversed signal is then supplied from reproducing head 16c to filter 13' which has substantially the same electrical characteristics as filter 13. Alternatively, the reproduced, reversed signal from reproducing head 16c may be supplied to filter 13 through suitable switching means to insure an exact duplication of the electrical characteristics of the filter through which the original seismic detector signal passed.

In the embodiment shown in Fig. 1, filter 13', being a substantial duplicate of filter 13, attenuates the signal from reproducing head 16c to substantially the same extent that filter 13 did; filter 13' also introduces the same degree of phase distortion into the signal as was introduced by filter 13. However, since the signal passing through filter 13' is the reverse of the signal which passed through filter 13, and therefore the phase distortion introduced by filter 13' has the opposite sign of the phase distortion introduced by filter 13, the net phase distortion is zero for the two passages of the signal through the filters 13 and 13'. The total transmission of the signal for the passages of the signal through filters 13 and 13' is the square of the transmission for the passage of the signal through one of the filters, so that, effectively, the signal has been more sharply filtered, and the phase distortion introduced by filter 13 has been substantially removed.

The reversed, substantially-undistorted signal from filter 13' is supplied to recording head 21b of recorder 21 to record the signal on magnetizable layer 21a. After recording, the direction of rotation of the drum is reversed and the recorded signal reproduced by head 21c in the normal or original sequence in which the signal occurred. The signal from reproducing head 21c is then supplied to signal processing means 25, where additional operations may be performed on the signal prior to recording and/or displaying on devices 26 and 27.

Fig. 2 illustrates an alternate embodiment of the invention adapted to compensate for the phase distortion introduced into the seismic detector signal by a plurality of electrical networks or devices in the seismic recording system. Such distortion-producing device may be, as shown in Fig. 2, the filtering network used in the field to filter the original seismic signal prior to recording and the filtering networks subsequently utilized, usually in the laboratory, for additional filtering of the signal reproduced from the original record. In Fig. 2, reference numerals 11, 12, 13 and 16 again designate, respectively, the seismic detector responsive to the seismic waves for producing the signal, the amplifier for amplifying the signal from detector 11, the filtering device 13 for filtering the signal prior to the original recording, and the recording means for reproducibly recording the signal.

Reproducing head 16c of recorder 16 is again connected to a filtering device 13' having substantially the same electrical characteristics as filtering device 13. The signal from filter 13' is supplied to a filtering device 31 representing a network for producing further filtering of the seismic detector signal. The signal from filter 31 is supplied to recording head 21b of magnetic drum 21 for recording the signal on the drum. The signal reproduced by head 21c is supplied to a filter 31' having substantially the same electrical characteristics as filter 31. The signal from filter 31' is supplied to signal processing means 25, and the output thereof is impressed on recording means 26 and/or display means 27.

To the operation of the embodiment illustrated in Fig. 2, the signal generated by seismic detector 11 is amplified in amplifier 12 and supplied to filter 13, where the signal is filtered to the desired extent and supplied to recording head 16b of recorder 16. As before, filter 13 introduces some phase distortion in the signal transmitted therethrough. After recording the signal on recorder 16, the direction of rotation of tape 16a is reversed and the signal reproduced through reproducing head 16c in the reverse order from that in which it occurred. The reversed signal is supplied to filter 13', where the phase distortion introduced by filter 13 is substantially removed, as described above in connection with Fig. 1, and the signal additionally filtered.

After passage through filter 13' the signal is supplied to filter 31, where additional filtering is performed. Filter 31 also introduces some type of phase distortion into the signal transmitted therethrough so that the output of filter 31, which is recorded on recorder 21, contains some phase distortion. After recording on recorder 21, the direction of rotation of the drum is reversed and the signal recorded thereon reproduced in reproducing head 21c in the reverse direction from which the signal was recorded, which results in the signal's being again in its normal sequence. The output of reproducing head 21c is supplied to filter 31', which filtering network has substantially the same electrical characteristics as filter 31. Filter 31', therefore, additionally filters the signal and removes the phase distortion introduced into the signal by filter 31. The output signal from filter 31' is supplied to signal processing means 25 and thence to recording means 26 and/or display means 27.

It will thus be seen that I have provided method and apparatus for operating on a seismic detector signal in such a manner as to substantially remove undesired phase distortion introduced either into the seismic waves in traveling through the earth or into the seismic detector signal by components of the recording and/or analyzing system. In the case of phase distortion in the seismic waves, the phase distortion is removed by reversing the time sequence of the seismic detector signal and playing the reversed signal through an electrical network having an electrical transfer function analogous to the acoustic transfer function of the portion of the earth in which the phase distortion occurred. In the case of phase distortion produced by components of the recording system, the distortion is removed by reversing the time sequence of the seismic detector signal and playing the reversed signal through either the distorting device itself or a substantial duplicate thereof.

It will be obvious to those skilled in the art that various modifications of the illustrated embodiments may be made without departing from the spirit of the invention or the scope of the appended claims. In particular, it will be apparent that a seismic detector signal may be repeatedly passed through an electrical network or device, such as a geophone, an amplifier or a filter, an even number of times with the direction of the signal reversed for half the number of such passages to substantially eliminate phase distortion introduced into the signal by the electrical device. Such a method of operation is particularly advantageous in the case of filtering a seismic signal, where, by passing the signal repeatedly through a network in the manner taught by this invention, the slope of the sides of the over-all frequency response curve may be made as steep as possible without introducing any substantial phase distortion into the final output signal.

I claim:

Apparatus for recording seismic vibrations comprising a seismic detector operable to translate vibrations into a seismic electric signal, a magnetic recorder, a field filter having its input connected to said seismic detector and its output connected directly to said magnetic recorder, said field filter being operable to restrict the frequency band of the seismic signal which is actually recorded and simultaneously to distort the seismic signal, means for reproducing the recorded signal in the laboratory in reverse time realitonship from that in which it was recorded, a second and a third filter, said second filter being connected directly between said reproducing means and said third filter and having distortion and frequency passband characteristics substantially the same as said field filter to remove the distortion introduced thereby, said third filter having a different frequency characteristic than said second filter and being operable to distort the signal, a second magnetic recorder connected to the output of said third filter, means for reproducing the signal recorder by said second recorder in reverse time relationship from that in which it was recorded to return the time sequence to that of the original seismic signal, a fourth filter, and an optical recorder, said fourth filter having its input connected directly to said last-named reproducing means and its output connected to said optical recorder and being the only filter between said last-named reproducing means and said optical recorder and having distortion and frequency characteristics substantially the same as said third filter to remove the distortion introduced thereby.

References Cited in the file of this patent

UNITED STATES PATENTS

| | | |
|---|---|---|
| 2,275,735 | Cloud | Mar. 10, 1942 |
| 2,588,915 | Erikson | Mar. 11, 1952 |
| 2,657,276 | Eliot | Oct. 27, 1953 |
| 2,672,944 | Minton | Mar. 23, 1954 |
| 2,725,534 | Hemphill | Nov. 29, 1955 |